US012581400B2

(12) United States Patent (10) Patent No.: US 12,581,400 B2
Yoon et al. (45) Date of Patent: Mar. 17, 2026

(54) WIRELESS COMMUNICATION METHOD IN WIRELESS FIDELITY NETWORK AND ELECTRONIC DEVICE FOR PERFORMING THE SAME

(71) Applicant: SAMSUNG ELECTRONICS CO., LTD., Suwon-si (KR)

(72) Inventors: Yeji Yoon, Suwon-si (KR); Seongsu Choi, Suwon-si (KR); Taeyong Kim, Suwon-si (KR); Hyunkee Min, Suwon-si (KR); Sunkee Lee, Suwon-si (KR); Junghun Lee, Suwon-si (KR); Junhak Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 403 days.

(21) Appl. No.: 18/115,748

(22) Filed: Feb. 28, 2023

(65) Prior Publication Data

US 2023/0209454 A1 Jun. 29, 2023

Related U.S. Application Data

(63) Continuation of application No. PCT/KR2022/016401, filed on Oct. 26, 2022.

(30) Foreign Application Priority Data

Dec. 27, 2021 (KR) ........................ 10-2021-0188586

(51) Int. Cl.
*H04W 48/18* (2009.01)
*H04W 8/00* (2009.01)
*H04W 76/10* (2018.01)

(52) U.S. Cl.
CPC ........... *H04W 48/18* (2013.01); *H04W 8/005* (2013.01); *H04W 76/10* (2018.02)

(58) Field of Classification Search
CPC ..... H04W 48/18; H04W 48/12; H04W 48/14; H04W 48/16; H04W 48/20; H04W 8/005;
(Continued)

(56) References Cited

U.S. PATENT DOCUMENTS

2013/0242783 A1* 9/2013 Horn ...................... H04W 88/10
370/252
2016/0044591 A1* 2/2016 Pao ........................ H04W 12/06
370/329
(Continued)

FOREIGN PATENT DOCUMENTS

KR 20130085949 A 7/2013
KR 20160030966 A 3/2016
(Continued)

OTHER PUBLICATIONS

International Search Report for International Application No. PCT/ KR2022/016401; International Filing Date Oct. 26, 2022; Issued Feb. 9, 2023; 4 Pages.

*Primary Examiner* — Farid Seyedvosoghi
(74) *Attorney, Agent, or Firm* — CANTOR COLBURN LLP

(57) ABSTRACT

A wireless communication method for a wireless fidelity (Wi-Fi) network and an electronic device for performing the same are provided. The electronic device includes a communication module configured to receive a beacon frame and/or a probe response frame from a peripheral access point (AP) device through wireless communication and a processor. The processor is configured to identify one or more network identifiers of a co-located AP device based on information of a reduced neighbor report (RNR) element field included in the beacon frame and/or the probe response frame, determine one or more candidate networks based on the network identifiers of the co-located AP device when access to another network from a network of a currently (Continued)

connected AP device is necessary, determine a target network for an access attempt among the one or more candidate networks, and attempt a connection to the determined target network.

11 Claims, 7 Drawing Sheets

(58) Field of Classification Search
CPC .. H04W 76/10; H04W 36/0072; H04W 84/12
See application file for complete search history.

(56) References Cited

U.S. PATENT DOCUMENTS

| | | | |
|---|---|---|---|
| 2019/0268892 A1 | 8/2019 | Gidvani et al. | |
| 2020/0221378 A1 | 7/2020 | Kneckt et al. | |
| 2020/0280909 A1 | 9/2020 | Gan et al. | |
| 2020/0344826 A1 | 10/2020 | Miura | |
| 2024/0098624 A1* | 3/2024 | Patil | H04W 12/73 |

FOREIGN PATENT DOCUMENTS

| | | | |
|---|---|---|---|
| KR | 20170062809 A | 6/2017 | |
| KR | 101810732 B1 | 12/2017 | |
| KR | 20170137347 A | 12/2017 | |
| WO | 2021011427 A1 | 1/2021 | |

* cited by examiner

100

| Network identifier | Network identifier of co-located AP |
|---|---|
| bssid1 | bssid2, bssid3 |
| bssid2 | bssid1, bssid3 |
| bssid3 | bssid1, bssid2 |
| bssid4 | |
| bssid5 | bssid6 |
| bssid6 | bssid5 |

FIG. 5

WIRELESS COMMUNICATION METHOD IN WIRELESS FIDELITY NETWORK AND ELECTRONIC DEVICE FOR PERFORMING THE SAME

CROSS-REFERENCE TO RELATED APPLICATIONS

This application is a continuation application, claiming priority under § 365 (c), of International Application No. PCT/KR2022/016401, filed on Oct. 26, 2022, which is based on and claims the benefit of Korean patent application number 10-2021-0188586, filed on Dec. 27, 2021, in the Korean Intellectual Property Office, the disclosures of which are incorporated by reference herein in their entireties.

BACKGROUND

1. Field

The disclosure relates to a wireless communication technology in a wireless fidelity (Wi-Fi) network.

2. Description of Related Art

Wireless fidelity (Wi-Fi) is a communication technology that enables electronic devices to connect to a wireless local area network (WLAN) and usually uses the band of 2.4 GHz and the band of 5 GHZ. Development of Wi-Fi communication technology in the 6 GHz band is being actively conducted. Devices that use Wi-Fi technology include, for example and without limitation, personal computers, game consoles, smartphones, digital cameras, tablet computers, Internet-of-things devices, printers, and the like. Wi-Fi compatible devices may access the Internet through a wireless access point (AP) device.

SUMMARY

Embodiments of the present disclosure are for preventing a connection attempt or roaming attempt to a network in which an Internet service is not available when switching is necessary from a current network to another network.

According to one embodiment, an electronic device includes a communication module which receives a beacon frame and/or a probe response frame from a peripheral access point (AP) device through wireless communication and a processor. The processor identifies one or more network identifiers of a co-located AP device based on information of a reduced neighbor report (RNR) element field included in the beacon frame and/or the probe response frame, determines one or more candidate networks based on the one or more network identifiers of the co-located AP device when access to another network from a network of a currently connected AP device is necessary, determines a target network for an access attempt among the one or more candidate networks, and attempts a connection to the determined target network.

According to one embodiment, an electronic device includes a communication module which receives a beacon frame and/or a probe response frame from a peripheral access point (AP) device through wireless communication and a processor. The processor identifies one or more network identifiers of a co-located AP device based on the beacon frame and/or the probe response frame, determines whether an AP device which performs communication on a second network is the same AP device as an AP device which performs communication on a first network based on the one or more network identifiers of the co-located AP device, when it is determined that wireless fidelity (Wi-Fi) roaming is necessary from the first network to the second network, and skips a transmission of an address resolution protocol (ARP) query to the AP device which performs the communication on the second network, and connect to the AP device which performs the communication on the second network when it is determined that the AP device which performs the communication on the second network is the same one as the AP device which performs the communication on the first network.

According to one embodiment, a wireless communication method includes receiving a beacon frame and/or a probe response frame from a peripheral access point (AP) device through wireless communication, identifying one or more network identifiers of a co-located AP device based on the beacon frame and/or the probe response frame, determining one or more candidate networks based on the one or more network identifiers of the co-located AP device when an access to another network from a network of a currently connected AP device is necessary, determining a target network for an access attempt among the one or more candidate networks, and attempting connection to the determined target network.

According to one embodiment, a wireless communication method includes receiving a beacon frame and/or a probe response frame from a peripheral access point (AP) device through wireless communication, identifying one or more network identifiers of a co-located AP device based on the beacon frame and/or the probe response frame, determining whether an AP device which performs communication on a second network is the same AP device as an AP device which performs communication on a first network based on the one or more network identifiers of the co-located AP device, when it is determined that Wi-Fi roaming is necessary from the first network to the second network, and skipping a transmission of an ARP query to the AP device which performs communication on the second network, and connecting to the AP device which performs the communication on the second network when it is determined that the AP device which performs communication on the second network is the same one as the AP device which performs communication on the first network.

According to embodiments, an attempt for connection or roaming is not made to a network in which an Internet service is not available, so the network may quickly switch to a network in which the Internet service is available, and the transmission and reception of unnecessary packets may be reduced, thereby reducing network load.

Also, according to embodiments, the attempt to connect to or roam a network in which an Internet service is not possible is not made in the process of connecting to or roaming another network, so Internet service-interruption time may be reduced.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 is a diagram illustrating an example of network identifier data of network identifiers according to an embodiment;

DETAILED DESCRIPTION

Figure 1:
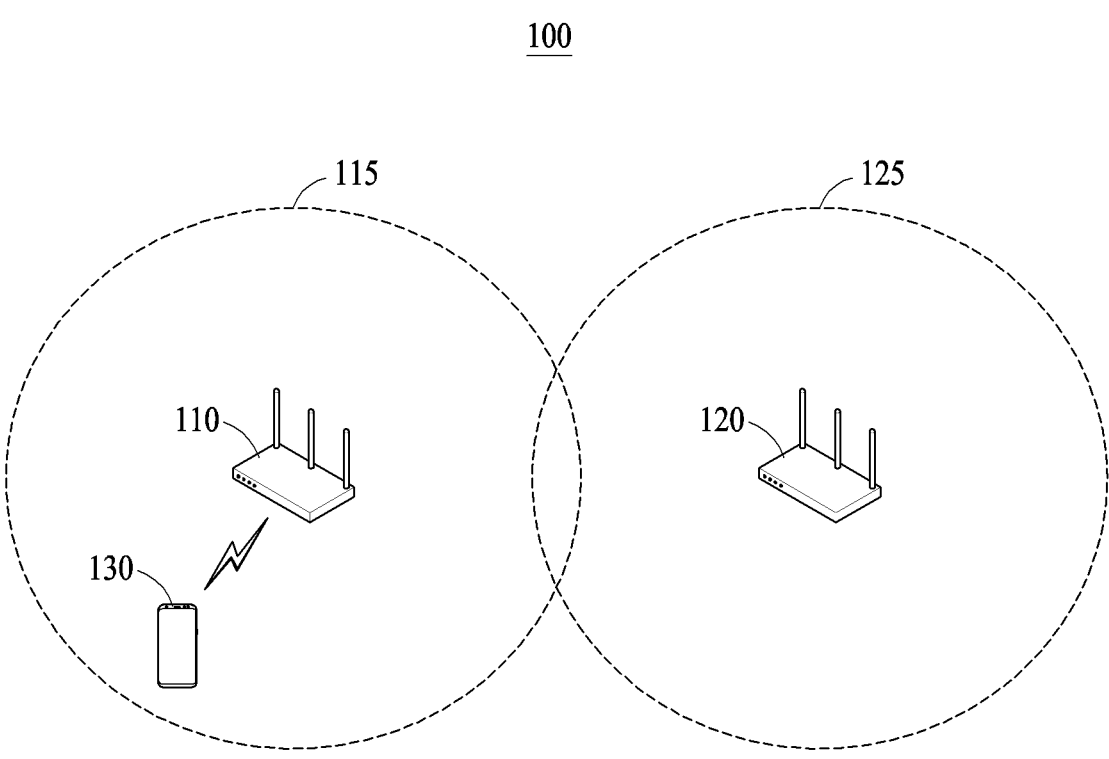
FIG. 1 is a diagram illustrating an overview of a wireless fidelity (Wi-Fi) network according to an embodiment.

Hereinafter, embodiments will be described in detail with reference to the accompanying drawings. When describing the embodiments with reference to the accompanying drawings, like reference numerals refer to like elements and redundant descriptions related thereto have been omitted.

FIG. 1 is a diagram illustrating an overview of a wireless fidelity (Wi-Fi) network according to an embodiment.

Referring to FIG. 1, a Wi-Fi network (or a wireless local area network (LAN) network) 100 may include one or more access point (AP) devices 110 and 120 and one or more electronic devices 130. The electronic device 130 may also be referred to as a station (STA) device or a non-AP device. The AP devices 110 and 120 may perform wireless communication (e.g., Wi-Fi communication) with one or more electronic devices (e.g., electronic devices 130) in a network according to a wireless communication protocol. The AP devices 110 and 120 are devices for connecting the electronic device 130 to the Internet or other devices using a Wi-Fi communication-related standard in the Wi-Fi network 100, and may include, for example and without limitation, a router device and/or a mobile hotspot device.

A basic service set (BSS) 115 and 125 may include an AP device 110, 120 and one or more electronic devices 130. As illustratively shown, the AP device 110 may communicate with the electronic device 130 within the basic service set 115 corresponding to the AP device 110, and the AP device 120 may communicate with an electronic device (not shown) within the basic service set 125 corresponding to the AP device 120. In the embodiment of FIG. 1, only one electronic device 130 is illustrated for the convenience of description, but the scope of the embodiment is not limited thereto. That is, multiple electronic devices may exist inside the basic service set(s) 115 and 125 and may communicate with each of the AP devices 110 and 120.

The electronic device 130 may be connected to the AP device 110 which performs wireless communication in a coverage area in which the electronic device 130 is located and may receive an Internet service through the AP device 110. Such an electronic device 130 may be a device of various forms. The electronic device 130, for example, may include, without limitation, a portable communication device (e.g., a smartphone), a tablet computer, a notebook computer, a laptop computer, a desktop computer, a set-top box, a personal digital assistant (PDA), a television, an audio device, a refrigerator, a washing machine, a dryer, an air purifier, a copier, a printer, a scanner, a multifunction device, a game device, a portable multimedia device, a portable medical device, a camera, a wearable device, a home appliance, or other electronic device (e.g., internet-of-things device), or the like. An electronic device according to an embodiment of the present disclosure is not limited to the devices listed above and may take any form or configuration, as will be appreciated by those of skill in the art.

The AP devices 110 and 120 may perform wireless communication by using the same or different communication channels (or frequency bands). In some configurations, the AP devices 110 and 120 and/or the electronic device 130 may perform wireless communication by using a plurality of communication channels (i.e., more than a single communication channel may be employed). The plurality of communication channels supported by the AP devices 110 and 120 may include a channel of a 2.4 GHz band, a channel of a 5 GHz band, and a channel of a 6 GHz band, but the scope of the embodiment is not limited to the communication channel(s) previously described, and may include other channels and/or frequency bands currently used or later developed.

Each AP device 110 and 120 may periodically transmit (e.g., broadcast) a beacon frame (or a beacon signal) in order to inform an available transmission schedule to the electronic devices in the Wi-Fi network 100. The beacon frame may include information (e.g., communication channel information) about a network operated by the respective AP device 110, 120. The AP devices 110 and 120 may transmit the beacon frame to each communication channel. The AP devices 110 and 120 may provide multiple networks even for the same communication channel. A physically identical AP device may use the same dynamic host configuration protocol (DHCP) and the same wide area network (WAN) port. A DHCP server may be provided by the AP device or may exist outside the AP device.

In one embodiment, the electronic device 130 may receive a beacon frame transmitted by the AP device 110 and may attempt connection to the AP device 110 based on information included in the beacon frame. Here, "connection" refers to an association between the AP device and the electronic device, which is forming a link between the AP device and the electronic device. The connection process between the electronic device 130 and the AP device 110 may include the electronic device 130 transmitting a probe request frame (or a probe request signal) to the AP device 110, the AP device 110 transmitting a probe response frame to the electronic device 130 in response, and the electronic device 130 requesting authentication and connection to the AP device 110. When authentication is completed, the connection between the electronic device 130 and the AP device 110 may be established.

Due to a movement of the electronic device 130 relative to the AP device 110, a distance from the AP device 110 which is connected to the electronic device 130 may increase, lowering the quality of the wireless communication and making normal use of the Internet service provided through the AP device 110 difficult. For continuous use of the Internet service, the electronic device 130 may switch the connection to a network which provides the best wireless communication quality in the location of the electronic device 130, and such a network connection switching may be referred to as Wi-Fi roaming. The electronic device 130 may collect information of the AP device adjacent to the electronic device 130 and may have a list of adjacent AP devices through channel scanning. The electronic device 130 may determine which communication channel the candidate AP devices for Wi-Fi roaming are operating in through channel scanning and may attempt connection to an AP device which is expected to have the best connection quality among the identified candidate AP devices.

In an embodiment, when the signal strength of the currently connected AP device 110 is less than or equal to a set threshold value, the electronic device 130 may determine that the communication quality decreased and may attempt to change the connection to another network. In some embodiments, the electronic device 130 may attempt to change a connection to another network when it is determined that a current Internet service is not available. After connecting to the Wi-Fi communication network through the AP device 110, the electronic device 130 may perform various operations, such as determining whether the Internet is disconnected and updating an address resolution protocol (ARP) table and a route table. Here, the ARP table refers to a table in which an Internet protocol (IP) address and media access control (MAC) address are matched one-to-one. The ARP may be used to convert the network layer address (e.g., an IP address) to a physical address (e.g., an ethernet hardware adapter address or a MAC address). The electronic device 130 may transmit a domain name system (DNS) query to a specific uniform resource locator (URL) address and thereby determine whether the DNS server responds. If the internet connection is disconnected, a DNS query timeout in which DNS server response is not received in a specified time or a DNS fail occurs, and when such a DNS query timeout or DNS fail occurs, it may be determined that internet service is not available. The electronic device 130 may select a target AP device with the best signal strength among the candidate AP devices derived from the channel scanning and may attempt connection to the selected target AP device. According to an embodiment, the target AP device may be selected by considering not only the signal strength but also channel utilization, noise level, or channel capacity. The criteria and method of selecting the target AP device are not limited thereto, and various criteria and methods may be applied without departing from the scope of the present disclosure.

Conventionally, although physically identical AP devices may use the same DHCP server and WAN port, the electronic device cannot determine whether the DHCP server and the WAN port are in the same hardware device, so if the MAC address of the basic service set identifier (BSSID) is different, the electronic device has to determine whether the Internet service is disconnected every time it connects to the network. Whether the internet service is disconnected may be determined through a response to DNS query or TCP connection after a DHCP response check (handshake) is completed in the AP device. Accordingly, an unnecessary connection process occurs and the network is not available when the connection process is ongoing. In a case in which the electronic device performs Wi-Fi roaming in a network of another BSSID, a process of determining whether the network to be connected is the same network as the previously connected network is necessary. The electronic device may transmit an ARP query to the network at the current location in order to check whether the networks are the same networks. Here, if the response to the ARP query is not received from the network, the electronic device has to determine that the network is a different network from the previous one and has to perform a process receiving a new IP address by exchanging a message with the DHCP server. In such a process, the electronic device cannot use the Internet service.

According to various embodiments of the present disclosure described in detail below, the electronic device 130 may check the information which shows that the AP device is the same hardware device to reduce the transmission of unnecessary packets after being connected to a new network, reducing network load, and may not perform connection or Wi-Fi roaming to an AP device with disconnected internet service. The electronic device 130 may use the information of a co-located AP device to attempt connection to another network, optimizing the Wi-Fi network 100. In the embodiments described in the present disclosure, the co-located AP device refers to an AP device which is physically (or hardware-wise) identical.

The electronic device 130 may use information included in the beacon frame or the probe response frame to identify a physically identical AP device and may efficiently perform connection to a new network by using the identification result. For example, the electronic device 130 may not attempt to connect to a network which has a different name and property from a network in which the Internet service is unavailable but is provided by the physically-same AP device. As another example, if the AP device of a first network which was accessed just before is determined as a physically-same AP device as that of a second network which will be accessed, the electronic device 130 may skip the transmission of the ARP query which is for determining whether the networks are identical and may perform communication with the second network using the IP address used in the communication with the first network.

Figure 2:
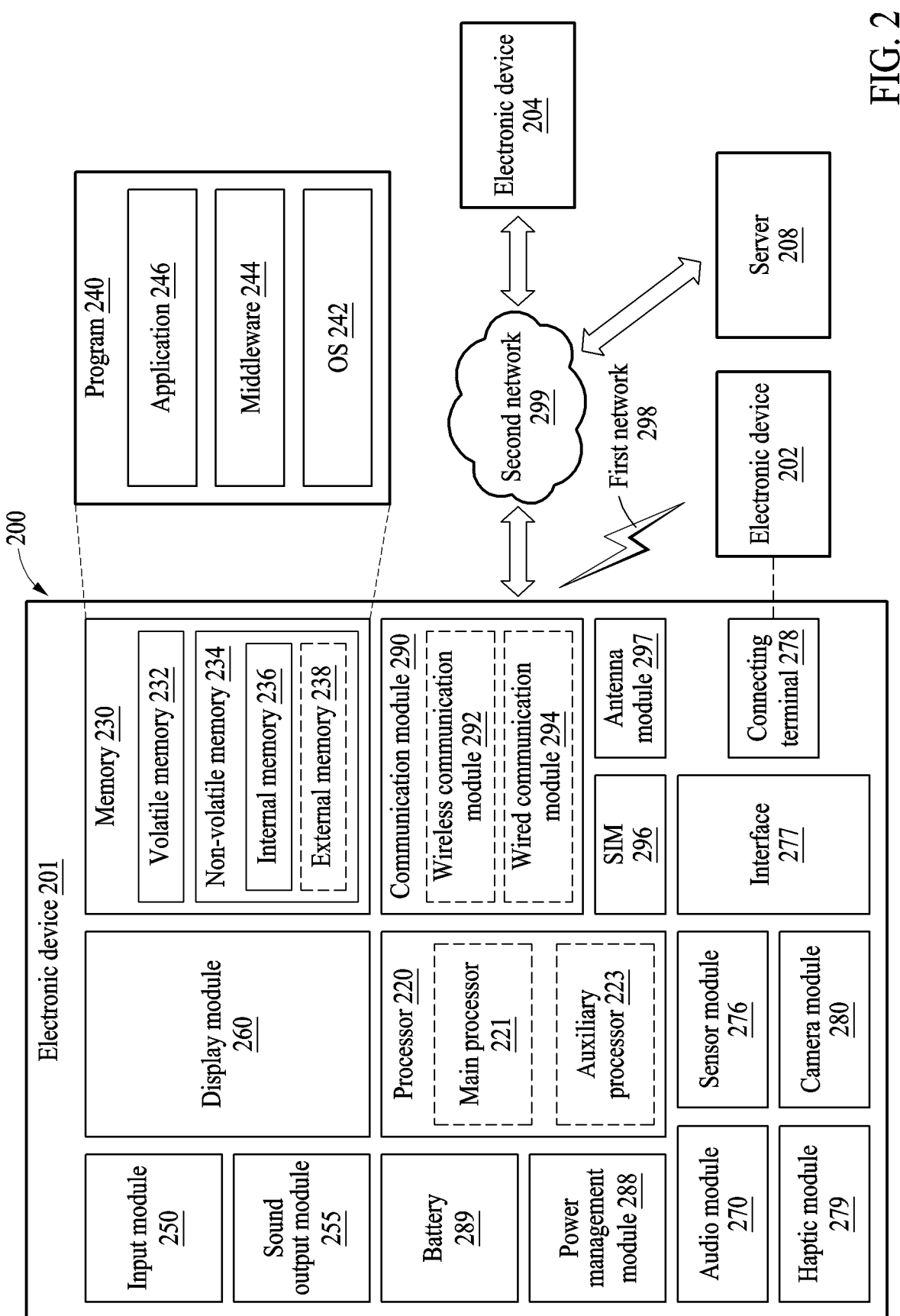
FIG. 2 is a block diagram illustrating an electronic device according to an embodiment.

FIG. 2 is a block diagram illustrating an electronic device 201 according to an embodiment. Referring to FIG. 2, the electronic device 201 in a network environment 200 may communicate with an electronic device 202 through a first communication network 298 (e.g., Bluetooth communication, a Wi-Fi network, and a short-range wireless communication network), or communicate with at least one of an electronic device 204 or a server 208 through a second communication network 299 (e.g., a long-range wireless communication network). The electronic device 201 may correspond to the electronic device 130 of FIG. 1, and the electronic device 202 may correspond to the AP device 110 of FIG. 1. According to one embodiment, the electronic device 201 may communicate with the electronic device 204 via the server 208.

According to one embodiment, the electronic device 201 may include a processor 220, a memory 230, an input module 250, a sound output module 255, a display module 260, an audio module 270, and a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one of the components (e.g., the connecting terminal 278) may be omitted from the electronic device 201, or one or more other components may be added in the electronic device 201. In some embodiments, some of the components (e.g., the sensor module 276, the camera module 280, or the antenna module 297) may be integrated as a single component (e.g., the display module 260).

The processor 220 may execute, for example, software (e.g., a program 240) to control at least one other component (e.g., a hardware or software component) of the electronic device 201 connected to the processor 220, and may perform various data processing or computation. According to one embodiment, as at least a part of data processing or computation, the processor 220 may store a command or data received from another component (e.g., the sensor module 276 or the communication module 290) in a volatile memory 232, process the command or the data stored in the volatile memory 232, and store resulting data in a non-volatile memory 234. According to one embodiment, the processor 220 may include a main processor 221 (e.g., a central processing unit (CPU) or an application processor (AP)) or an auxiliary processor 223 (e.g., a graphics processing unit (GPU), a neural processing unit (NPU), an image signal processor (ISP), a sensor hub processor, or a communication processor (CP)) that is operable independently of, or in conjunction with the main processor 221. For example, when the electronic device 201 includes the main processor 221 and the auxiliary processor 223, the auxiliary processor 223 may be adapted to consume less power than the main processor 221 or to be specific to a specified function. The auxiliary processor 223 may be implemented separately from the main processor 221 or as a part of the main processor 221.

The auxiliary processor 223 may control at least some of functions or states related to at least one (e.g., the display module 260, the sensor module 276, or the communication module 290) of the components of the electronic device 201, instead of the main processor 221 while the main processor 221 is in an inactive (e.g., sleep) state or along with the main processor 221 while the main processor 221 is an active state (e.g., executing an application). According to one embodiment, the auxiliary processor 223 (e.g., an ISP or a CP) may be implemented as a portion of another component (e.g., the camera module 280 or the communication module 290) that is functionally related to the auxiliary processor 223. According to one embodiment, the auxiliary processor 223 (e.g., an NPU) may include a hardware structure specified for artificial intelligence model processing. An artificial intelligence model may be generated by machine learning. Such learning may be performed by, for example, the electronic device 201 in which artificial intelligence is performed, or performed via a separate server (e.g., the server 208). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 230 may store various pieces of data used by at least one component (e.g., the processor 220 or the sensor module 276) of the electronic device 201. The various pieces of data may include, for example, software (e.g., the program 240) and input data or output data for a command related thereto. The memory 230 may store computer-executable instructions. The processor 220 may execute the instructions by accessing the memory 230. The memory 230 may include the volatile memory 232 or the non-volatile memory 234.

The program 240 may be stored as software in the memory 230, and may include, for example, an operating system (OS) 242, middleware 244, or an application 246. The input module 250 may receive, from outside (e.g., a user) the electronic device 201, a command or data to be used by another component (e.g., the processor 220) of the electronic device 201. The input module 250 may include, for example, a microphone, a mouse, a keyboard, a key (e.g., a button), or a digital pen (e.g., a stylus pen).

The sound output module 255 may output a sound signal to the outside of the electronic device 201. The sound output module 255 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 260 may visually provide information to the outside (e.g., a user) of the electronic device 201. The display module 260 may include, for example, a control circuit for controlling a display, a hologram device, or a projector and control circuitry to control its corresponding one of the display, the hologram device, and the projector. According to one embodiment, the display module 260 may include a touch sensor adapted to sense a touch, or a pressure sensor adapted to measure the intensity of force applied by the touch.

The audio module 270 may convert sound into an electrical signal or vice versa. According to one embodiment, the audio module 270 may obtain the sound via the input module 250 or output the sound via the sound output module 255 or an external electronic device (e.g., an electronic device 202 such as a speaker or a headphone) directly or wirelessly connected to the electronic device 201.

The sensor module 276 may detect an operational state (e.g., power or temperature) of the electronic device 201 or an environmental state (e.g., a state of a user) external to the electronic device 201, and generate an electrical signal or data value corresponding to the detected state. According to one embodiment, the sensor module 276 may include, for example, a location sensor, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used by the electronic device 201 to couple with the external electronic device (e.g., the electronic device 202) directly (e.g., by wire) or wirelessly. According to one embodiment, the interface 277 may include, for example, a high-definition multimedia interface (HDMI), a universal serial bus (USB) interface, a secure digital (SD) card interface, or an audio interface.

The connecting terminal 278 may include a connector via which the electronic device 201 may be physically connected to an external electronic device (e.g., the electronic device 202). According to one embodiment, the connecting terminal 278 may include, for example, an HDMI connector, a USB connector, an SD card connector, or an audio connector (e.g., a headphone connector).

The haptic module 279 may convert an electric signal into a mechanical stimulus (e.g., a vibration or a movement) or an electrical stimulus which may be recognized by a user via their tactile sensation or kinesthetic sensation. According to one embodiment, the haptic module 279 may include, for example, a motor, a piezoelectric element, or an electric stimulator.

The camera module 280 may capture a still image and moving images. According to one embodiment, the camera module 280 may include one or more lenses, image sensors, ISPs, or flashes.

The power management module 288 may manage power supplied to the electronic device 201. According to one embodiment, the power management module 288 may be implemented as, for example, at least a part of a power management integrated circuit (PMIC). The battery 289 may supply power to at least one component of the electronic device 201. According to one embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently of the processor 220 (e.g., an AP) and that support a direct (e.g., wired) communication or a wireless communication. According to one embodiment, the communication module 290 may include a wireless communication module 292 (e.g., a Wi-Fi communication module, a cellular communication module, a short-range wireless communication module, or a global navigation satellite system (GNSS) communication module) or a wired communication module 294 (e.g., a local area network (LAN) communication module, or a power line communication (PLC) module). A corresponding one of these communication modules may communicate with the external electronic device 202 via the first communication network 298 (e.g., a short-range communication network, such as Bluetooth™, wireless-fidelity (Wi-Fi), Wi-Fi direct, or infrared data association (IrDA)) or may communicate with the external electronic device 204 via the second communication network 299 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first communication network 298 or the second communication network 299 by using subscriber information (e.g., international mobile subscriber identity (IMSI)) stored in the SIM 296.

The wireless communication module 292 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., a mmWave band) to achieve, e.g., a high data transmission rate. The wireless communication module 292 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 292 may support various requirements specified in the electronic device 201, an external electronic device (e.g., the electronic device 204), or a network system (e.g., the second communication network 299). According to one embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to one embodiment, the antenna module 297 may include an antenna including a radiating element including a conductive material or a conductive pattern formed in or on a substrate (e.g., a printed circuit board (PCB)). According to one embodiment, the antenna module 297 may include a plurality of antennas (e.g., array antennas). In such a case, at least one antenna appropriate for a communication scheme used in a communication network, such as the first communication network 298 or the second communication network 299, may be selected from the plurality of antennas by, for example, the communication module 290. The signal or power may be transmitted or received between the communication module 290 and the external electronic device via the at least one selected antenna. According to one embodiment, another component (e.g., a radio frequency integrated circuit (RFIC)) other than the radiating element may be additionally formed as a part of the antenna module 297.

According to various embodiments, the antenna module 297 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second communication network 299. Each of the external electronic devices (e.g., the electronic device 202 or 204) may be a device of a same type as or a different type from the electronic device 201. According to one embodiment, all or some of operations to be executed by the electronic device 201 may be executed at one or more of external electronic devices (e.g., the external electronic devices 202 and 204, or the server 208). For example, if the electronic device 201 needs to perform a function or a service automatically, or in response to a request from a user or another device, the electronic device 201, instead of, or in addition to, executing the function or the service, may request one or more external electronic devices to perform at least portion of the function or service. The one or more external electronic devices receiving the request may perform the at least part of the function or service, or an additional function or an additional service related to the request, and may transfer a result of the performance to the electronic device 201. The electronic device 201 may provide the result, with or without further processing the result, as at least part of a response to the request. To that end, a cloud computing, distributed computing, mobile edge computing (MEC), or client-server computing technology may be used, for example. The electronic device 201 may provide ultra low-latency services using, e.g., distributed computing or mobile edge computing. In another embodiment, the external electronic device 204 may include an Internet-ofthings (IoT) device or may be a portion or part of an IoT device or may form the entire IoT device.

The server 208 may be an intelligent server using machine learning and/or a neural network. According to one embodiment, the external electronic device 204 or the server 208 may be included in the second network 299. The electronic device 201 may be applied to intelligent services (e.g., a smart home, a smart city, a smart car, healthcare, etc.) based on 5G communication technology or IoT-related technology.

According to an embodiment, the electronic device 201 may perform wireless communication on a Wi-Fi network. The communication module 290 included in the electronic device 210 may receive at least one of a beacon frame and a probe response frame (e.g., a beacon frame or a probe response frame 310 of FIG. 3) from a peripheral AP device (e.g., the AP device 110 of FIG. 1) through wireless communication. The peripheral AP device refers to an AP device located in the vicinity of a location where the electronic device 201 is located. The peripheral AP device may include, for example, one or more AP devices to which the electronic device 210 can access from where the electronic device 210 is located.

The processor 220 may identify one or more network identifiers (e.g., basic service set identifier (BSSID)) of a co-located AP device based on the received beacon frame and/or the probe response frame. The processor 220 may identify the one or more network identifiers of the co-located AP device based on a reduced neighbor report (RNR) element field (e.g., an RNR element field 330 of FIG. 3) included in the beacon frame and/or the probe response frame. The information of the RNR element field may include information about a MAC address which corresponds to a channel and a basic service set ID of a peripheral basic service set ID. A RNR element field may include a subfield which indicates whether the basic service set ID, which corresponds to a BSSID and a neighbor report corresponding to the beacon frame or the probe response frame, belongs to the co-located AP device. The processor 220 may identify the one or more network identifiers of the co-located AP device based on the value of the corresponding subfield. The processor 220 may identify the one or more network identifiers of the co-located AP device based on information about the neighbor AP device included in the RNR element field.

The processor 220 may generate network identifier data (e.g., network identifier data illustrated in FIG. 5) which shows information about the network identifiers of the co-located AP device. The network identifier data may also be referred to as "mapping data." In an embodiment, the processor 220 may generate network identifier data of the network identifiers of all peripheral AP devices, and may generate network identifier data of only the network identifiers of the currently connected AP device. The processor 220 may update the network identifier data based on at least one of information obtained from channel scanning and a beacon frame received from the currently connected network.

The processor 220 may determine one or more candidate networks based on the network identifiers of the co-located AP device when it is necessary to change the access from the network of the currently connected AP device to another network. Here, the case in which it is necessary to change the access from the network of the currently connected AP device to another network may include, for example, at least one of a case in which the quality of the currently connected network does not meet a specified condition and a case in which Internet connection of the currently connected network is not available. The processor 220 may identify one or more networks operated by the currently connected AP device based on the network identifiers (or network identifier data) of the co-located AP device and may determine one or more candidate networks by excluding one or more networks identified among the candidate networks determined by excluding one or more networks identified from the candidate networks determined by channel scanning.

The processor 220 may determine a target network for an access attempt among one or more determined candidate networks and may attempt connection to the determined target network. The processor 220 may, for example, determine a candidate network with the best communication quality (e.g., received signal strength indicator (RSSI)) among one or more candidate networks as the target network.

According to another embodiment, the processor 220 may determine whether the AP device performing the communication on the second network and the AP device performing the communication on the first network are an identical AP device based on the network identifiers of the same AP device, when it determines that it is necessary to switch Wi-Fi roaming from the first network to the second network. The processor 220 may skip transmission of the ARP query to the AP device which performs the communication on the second network and may connect to the AP device which performs the communication on the second network when it is determined that the AP device which performs the communication on the second network is identical to the AP device which performs the communication on the first network. In some embodiments, when it is determined that the AP device which performs the communication on the second network is identical to the AP device which performs the communication on the first network, the processor 220 may estimate the communication quality of the second network based on the communication quality of the first network, and if the estimated communication quality of the second network meets a set condition, the processor 220 may attempt connection to the second network without a channel scanning process.

When it is determined that the AP device which performs the communication on the second network is identical to the AP device which performs the communication on the first network, the processor 220 may use the IP address used for communication on the first network to perform communication on the second network.

When it is determined that the AP device which performs the communication on the second network is not identical to the AP device which performs the communication on the first network, the processor 220 may request allocation of a new IP address to the AP device which performs communication on the second network, and may perform communication on the second network with the IP address newly allocated by the AP device which performs communication on the second network.

Figure 3:
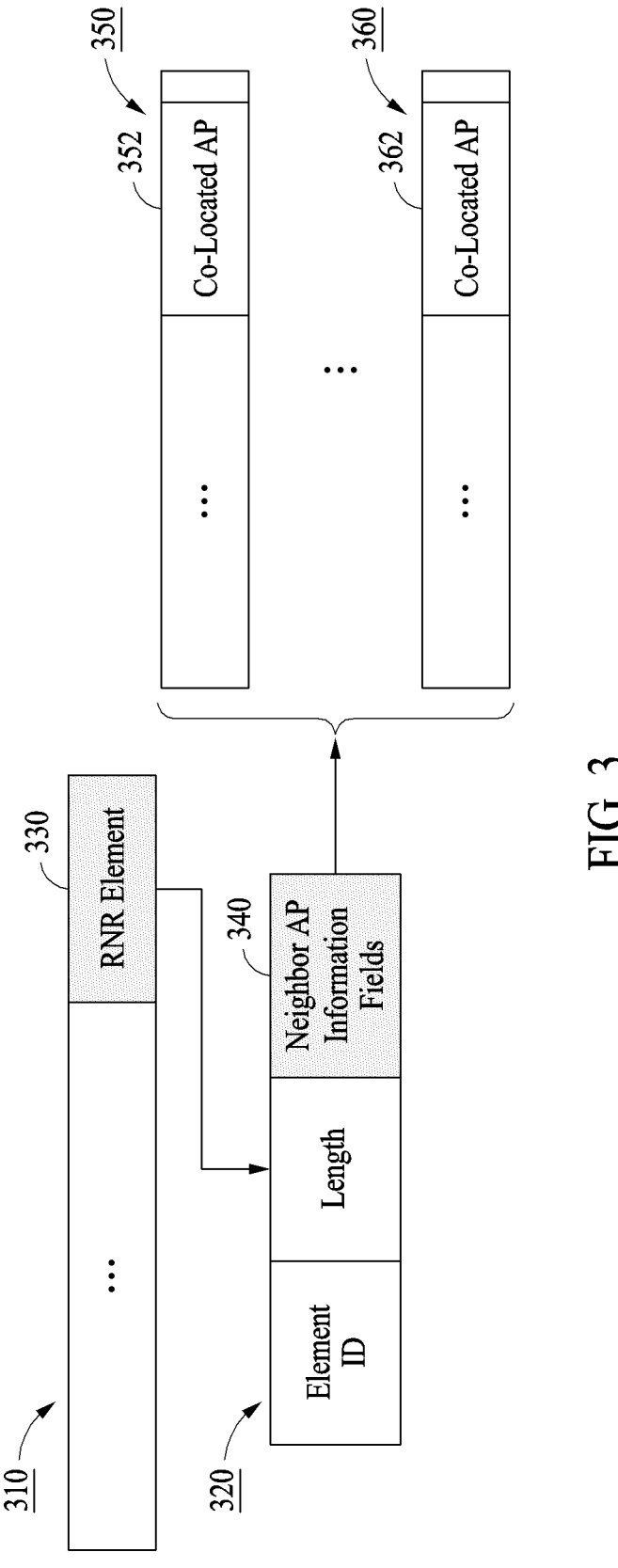
FIG. 3 is a diagram illustrating a reduced neighbor report (RNR) element field including information of a co-located access point (AP) device according to an embodiment.
Figure 4:
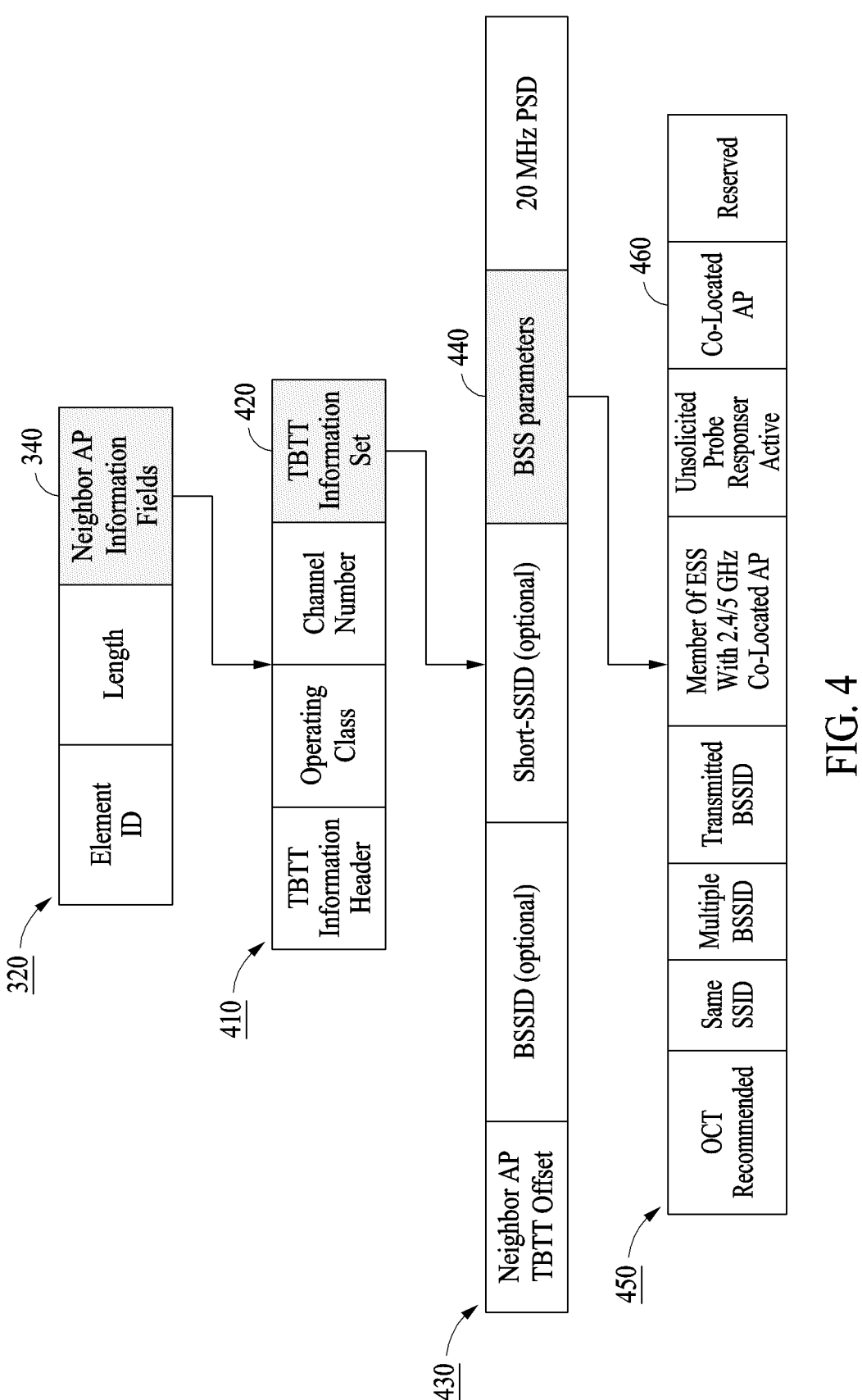
FIG. 4 is a diagram illustrating a reduced neighbor report (RNR) element field including information of a co-located access point (AP) device according to one embodiment.

FIGS. 3 and 4 are diagrams illustrating an RNR element field including information of a co-located AP device according to an embodiment.

Referring to FIG. 3, a reference code 310 indicates a beacon frame or a probe response frame. The beacon frame or probe response frame may include an RNR element field 330 which includes information about a neighbor AP device. The neighbor AP device may be at least one AP device adjacent to a current AP device which is connected with an electronic device (e.g., the electronic device 130 of FIG. 1 or the electronic device 201 of FIG. 2). The neighbor AP device may be a single neighbor AP device, or may be more than one neighbor AP device. The RNR element field 330 may include information regarding the single neighbor AP device or information regarding a plurality of neighbor AP devices. The AP device may add information of the peripheral AP device such as service set identifier (SSID), channel information, operation channel and beacon frame transmission time to the beacon frame or the probe response frame and transmit it. The RNR element field 330 may include various pieces of information associated with the neighbor AP device(s).

A reference code 320 indicates subfields included in the RNR element field 330. The RNR element field 330, as shown in reference code 320, may include an element identifier (ID) field, a length field, and one or more subfields of neighbor AP information fields 340. The element identifier field may include information about an identifier for identifying the element of the RNR element field 330, and the length field may include information about the sum of the length of the RNR element field 330.

When an electronic device (e.g., the electronic device 130 of FIG. 1 or the electronic device 201 of FIG. 2) receives a beacon frame or a probe response frame, the electronic device may read the information of the RNR element field 330 included in the received beacon frame or the probe response frame. The electronic device may obtain channel information of a peripheral BSSID and MAC address information of a peripheral BSSID from information of the RNR element field. The electronic device may identify the network identifiers of the co-located AP devices based on information indicated in the neighbor AP device fields 340 of the RNR element field 330.

Reference codes 350 and 360 indicate information of each neighbor AP device included in the neighbor AP device fields 340. For example, the reference code 350 indicates information of a first neighbor AP device, and the reference code 360 indicates information about a second neighbor AP device. The second neighbor AP device may be physically identical to the first neighbor AP device, or physically different from the first neighbor AP device. The neighbor AP information fields 340 may include information about the network identifier of the AP device (physically and hardware-wise) identical to each neighbor AP device. The neighbor AP information fields 340 are described in more detail in FIG. 4.

Referring to FIG. 4, a reference code 410 indicates subfields included in any one of the neighbor AP information fields among neighbor AP information fields 340; a reference code 430 indicates subfields included in a target beacon transmission time (TBTT) information set field 420 of the reference code 410; and a reference code 450 indicates subfields included in a BSS parameters field 440 of the reference code 430. The neighbor AP information field 340 may include, for example and shown as reference code 410, subfields of a TBTT information header field, an operating class field, a channel number field, and the TBTT information set field 420. A co-located AP field 460 (e.g., co-located AP fields 352 and 362 of FIG. 3) may be included in the BSS parameters field 440 of the reference code 430. For example, if the value of the co-located AP field 460 is "1", it may indicate that the BSSID which currently transmits the beacon frame or the probe response frame and the BSSID of the neighbor report are included in a physically identical AP device. The electronic device may identify network identifiers of a physically identical AP device based on information of the co-located AP field 460 included in each neighbor AP information field 340.

FIG. 5 is a diagram illustrating network identifier data of network identifiers according to an embodiment.

The electronic device (e.g., the electronic device 130 of FIG. 1 or the electronic device 201 of FIG. 2) may generate, store, and manage network identifier data about network identifiers as shown in FIG. 5. The electronic device may generate network identifier data based on the information of the RNR element field included in the received beacon frame or the probe response frame. The network identifier data may include information about the network identifier of the co-located AP device corresponding to each network identifier (e.g., BSSID). The network identifier data may be stored, for example, in a form of a table. According to the illustrated network identifier data shown in FIG. 5, networks corresponding to network identifiers BSSID1, BSSID2, and BSSID3 all belong to the same co-located AP device, and networks corresponding to network identifiers BSSID5 and BSSID6 all belong to the same co-located AP device. The illustrated network identifier data of FIG. 5 illustrates that there is no network identifier which belongs to an AP device co-located with a network identifier BSSID4 among the discovered network identifiers.

In an embodiment, the electronic device may update the network identifier data through a channel scanning (e.g., a full scan or a partial scan) before network connection. Even after connecting to the network, the electronic device may update the network identifier data based on information obtained through channel scanning. The electronic device may continually receive the beacon frame of the currently connected network after connecting to the network and may update the network identifier data based on the information of the received beacon frame (e.g., the information of the RNR element field). According to an embodiment, the electronic device may generate and manage a network identifier data about the network identifiers of only the currently connected AP device. Also, the electronic device may generate network identifier data of the network identifier of only the connected network by transmitting the probe request frame.

Figure 6:
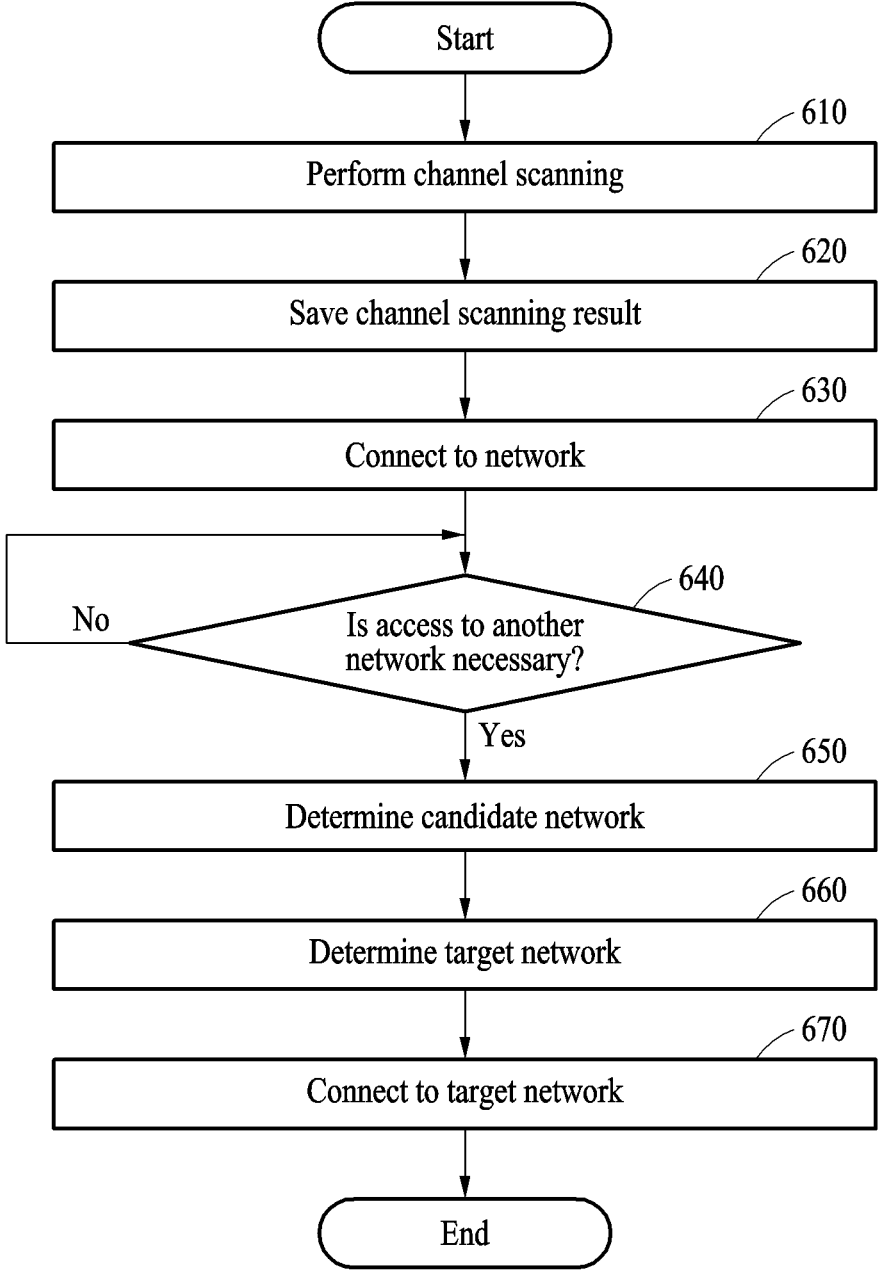
FIG. 6 is a flowchart illustrating an operation of a wireless communication method in a Wi-Fi network according to an embodiment.

FIG. 6 is a flowchart illustrating operation of a wireless communication method in a Wi-Fi network according to an embodiment. The wireless communication method of FIG. 6 may be performed by an electronic device (e.g., the electronic device 130 of FIG. 1 or the electronic device 201 of FIG. 2).

Referring to FIG. 6, the electronic device may perform channel scanning in operation 610 of peripheral communication channels (e.g., 2.4 GHz band, 5 GHz band, 6 GHz band, etc.) and store the channel scanning result(s) in operation 620. In operation 620, the electronic device may store an information list (including BSSID and SSID information) which is obtained as a result of the channel scanning of operation 610. The electronic device may store channel information of the SSIDs confirmed to be those of the AP device identical to the currently connected AP device. The electronic device may receive the beacon frame and/or the probe response frame from a peripheral AP device through wireless communication and may identify network identifiers of the co-located AP device based on the beacon frame and/or the probe response frame. The electronic device may identify network identifiers of the co-located AP device based on the information of the RNR element field included in the beacon frame and/or the probe response frame. The electronic device may identify the network identifiers of the co-located AP device based on information about the neighbor AP device included in the RNR element field. The RNR element field may include a subfield which indicates whether the basic service set ID corresponding to the beacon frame or the probe response frame and the basic service set ID corresponding to the neighbor report belong to the co-located AP device. The electronic device may identify the network identifiers of the co-located AP device based on the corresponding subfield value. The electronic device may confirm and store the network identifier information about the co-located AP device from the channel scanning result. The electronic device may generate and manage the network identifier data which indicates information about the network identifiers of the co-located AP device.

In operation 630, the electronic device may connect to the network based on the channel scanning result. The electronic device may determine whether there is a network matching a saved network among the discovered networks in the channel scanning process. If there is no network matching the saved networks, the electronic device may wait until a specific network is selected by the user. The electronic device may attempt to connect to the matching network if there is one network matching the saved networks and may attempt to connect to a network having the highest priority (e.g., a network with the strongest received signal strength) among the saved networks if there are multiple networks matching the saved networks. Even after connecting to a network, the electronic device may perform channel scanning and Wi-Fi roaming.

In operation 640, the electronic device may determine whether access to another network from the network of the currently connected AP device is necessary. For example, when the quality of the currently connected network does not meet one or more set conditions (e.g., when the strength of the received signal is less than or equal to a threshold value) or when an Internet connection is not available in the currently connected network, the electronic device may determine that access to another network is necessary. The electronic device may transmit the ARP query or the DNS query to the currently connected AP device after connecting to the network and determine whether Internet service is available based on the response.

When access to another network is necessary from the network of the currently connected AP device, the electronic device may determine one or more candidate networks based on the network identifiers of the co-located AP device in operation 650. When the electronic device determines that access to another network is necessary ("yes" at operation 640), the electronic device may perform channel scanning (e.g., a full scan or a partial scan) to determine whether there is a good network or AP device nearby. The electronic device may identify one or more networks provided by the currently connected AP device based on the network identifiers of the co-located AP device. The electronic device may determine one or more candidate networks by excluding one or more networks identified among the candidate networks determined through channel scanning.

When it is determined that Internet service of the currently connected network is not available, the network identifiers of the network, which is determined to belong to the AP device of the identical hardware, may be determined to have no Internet access. By excluding the networks which belong to the AP device with unavailable Internet service from the list of candidate networks for access attempt, unnecessary attempt(s) to connect to a network with unavailable Internet service may be prevented. In some cases, the AP device provides not only the same SSID but also multiple SSIDs, and in this case, the networks of BSSIDs which belong to the co-located AP device which is judged to have unavailable Internet service may be excluded from the list of candidate networks for access attempt(s). This may be equally applied when selecting the candidate network in the process of Wi-Fi roaming.

When a single electronic device supports a plurality of terminals (stations) which can access the AP device, each terminal may be connected to different SSID networks. Although the SSID may be different, a BSSID which is determined to be a co-located AP device may exist, and the terminals may exchange information about the co-located AP device so that each terminal may use the information about the co-located AP device to select a connectable candidate network when changing the network or performing Wi-Fi roaming. As described above, networks of the network identifiers which belong to an AP device with unavailable Internet service may be excluded from the list of candidate networks.

In operation 660, the electronic device may determine a target network to attempt to access among one or more candidate networks. The electronic device may, for example, determine the candidate network with the best communication quality as the target network among one or more candidate networks. In operation 670, the electronic device may attempt to connect to the determined target network. The electronic device may request allocation of a new IP address to the AP device of the target network and may use the Internet service based on the new IP address allocated from the AP device of the target network.

Figure 7:
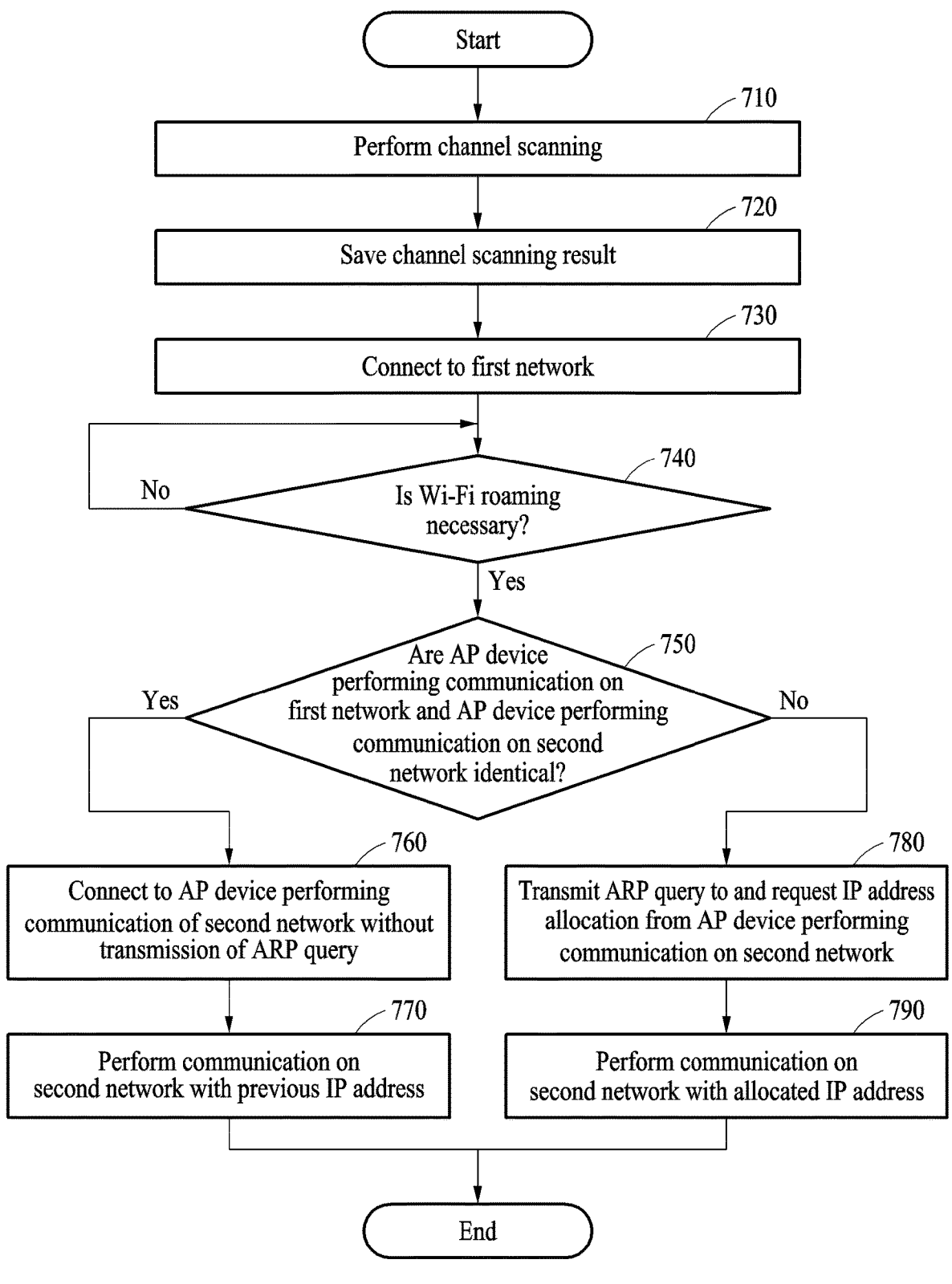
FIG. 7 is a flowchart illustrating a wireless communication method in a Wi-Fi network according to an embodiment.

FIG. 7 is a flowchart illustrating a wireless communication method in a Wi-Fi network according to another embodiment. The wireless communication method of FIG. 7 may be performed by an electronic device (e.g., the electronic device 130 of FIG. 1 or the electronic device 201 of FIG. 2).

Referring to FIG. 7, operations 710 (channel scanning) and 720 (saving scan results) may correspond to operations 610 and 620 of FIG. 6 respectively, and redundant descriptions have been omitted. In operation 730, the electronic device may connect to a first network based on the channel scanning result. Operation 730 may correspond to a process of connecting to the network in operation 630 of FIG. 6, and redundant descriptions have been omitted.

In operation 740, the electronic device may determine whether Wi-Fi roaming from the first network to a second network is necessary. For example, the electronic device may determine that Wi-Fi roaming is necessary when the signal strength received from the first network is less than or equal to a threshold value, when a request for channel change to the second network is received from the user, or when it is determined that a signal strength of the second network is greater than a signal strength of the first network. When the signal strength received from the first network is less than or equal to the threshold value, the electronic device may perform a partial scan or a full scan based on the channel scanning result and determine the second network which the optimal candidate network will attempt access to. For example, a candidate network with the highest score according to a scoring based on received signal strength, channel capacity, communication channel band, and others may be selected as the optimal candidate network among the candidate networks discovered by channel scanning. As another example, when a network with a previously connected history is discovered, the discovered network may be determined as the second network. Wi-Fi roaming may include both cases in which the BSSID changes and the communication channel changes.

If it is determined that Wi-Fi roaming from the first network to the second network is necessary, the electronic device may determine whether the AP device which performs the communication on the second network is the same AP device as the AP device which performs the communication on the first network based on the network identifiers of the co-located AP device in operation 750. The electronic device may determine whether the AP device which performs communication on the first network is a physically identical AP device as the AP device which performs communication on the second network based on the information about the network identifiers of the co-located AP device generated from the information of the RNR element field.

If it is determined that the AP device which performs the communication on the second network is the same AP device as the AP device which performs the communication on the first network ("yes" at operation 750), in operation 760 the electronic device may skip the transmission of the ARP query to the AP device which performs the communication on the second network and may connect to the AP device which performs the communication on the second network. The electronic device may request connection to the second network without channel scanning or checking the state of the second network when connecting to the second network. When it is already determined that the Internet service is available in the communication on the first network through an ARP query, the electronic device may perform Wi-Fi roaming on the second network and then skip determining whether the second network is the same AP device as the first network.

The RNR element field may include the BSSID and communication channel information of the neighbor AP device, and the electronic device may estimate the received signal strength of the second network of the co-located AP device based on information of such RNR element field and the RSSI of the currently connected first network. When it is determined that the expected strength of the received signal is greater than or equal to the set threshold value and normal Wi-Fi roaming is possible, the electronic device may transmit an authentication request message to the BSSID of the second network and attempt connection without channel scanning during Wi-Fi roaming.

In operation 770, the electronic device may use the Internet protocol address used in the communication on the first network to perform communication on the second network. The electronic device may perform communication on the second network by using the information of the network used for the communication on the first network. When it is determined that the AP device which performs the communication on the second network is the same AP device as the AP device which performs the communication on the first network, the electronic device may not check the state of the second network and quickly use the service through the second network.

When it is determined that the AP device which performs the communication on the second network is not the same AP device as the AP device which performs the communication on the first network ("no" at operation 750), the electronic device may transmit an ARP query to the AP device which performs communication on the second network and request allocation of a new IP address in operation 780. Thereafter, in operation 790, the electronic device may perform communication on the second network using the allocated IP address.

According to the above-described embodiments, connection or a Wi-Fi roaming attempt is not made to a network or AP device with unavailable Internet service, so connection may quickly shift to a network with available Internet service, and an uninterrupted Internet service may be provided to the user. Also, when Wi-Fi roaming is performed between the networks of the same AP device, an unnecessary access process is skipped and previous IP address information is used as is, resulting in quick network changes and reduces both unnecessary packets and network load.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-specific integrated circuit (ASIC).

Various embodiments as set forth herein may be implemented as software (e.g., the program 240) including one or more instructions that are stored in a storage medium (e.g., the internal memory 236 or the external memory 238) that is readable by a machine (e.g., the electronic device 201). For example, a processor (e.g., the processor 220) of the machine (e.g., the electronic device 201) may invoke at least one of the one or more instructions stored in the storage medium and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An electronic device comprising:
   a communication module configured to receive a beacon frame and/or a probe response frame from a peripheral access point (AP) device through a wireless communication; and
   a processor,
   wherein the processor is configured to:
   perform channel scanning;
   identify one or more network identifiers of a co-located AP device based on the beacon frame and/or the probe response frame;
   determine one or more candidate networks by excluding one or more networks identified based on the one or more network identifiers of the co-located AP device from one or more candidate networks determined by the channel scanning, in response to access to another network from a network of a currently connected AP device is determined to be necessary;
   determine a target network for an access attempt among the one or more candidate networks; and
   attempt a connection to the determined target network.

2. The electronic device of claim 1, wherein the processor is configured to identify the one or more network identifiers of the co-located AP device based on information of a reduced neighbor report (RNR) element field which is included in the beacon frame and/or the probe response frame.

3. The electronic device of claim 2, wherein the processor is configured to identify the one or more network identifiers of the co-located AP devices based on information about a neighbor AP device included in the RNR element field.

4. The electronic device of claim 2, wherein the information of the RNR element field comprises information about a channel of a peripheral basic service set identifier (BSSID) channel and a media access control (MAC) address corresponding to a basic service set ID.

5. The electronic device of claim 2, wherein
   the RNR element field comprises a subfield which indicates whether a basic service set ID corresponding to the beacon frame or the probe response frame and a basic service set ID corresponding to a neighbor report belong to the co-located AP device, and
   the processor is configured to identify the one or more network identifiers of the co-located AP device based on a value of the subfield.

6. The electronic device of claim 1, wherein the processor is configured to generate network identifier data which indicates information about the one or more network identifiers of the co-located AP device.

7. The electronic device of claim 6, wherein the processor is configured to generate the network identifier data only for one or more network identifiers of the currently connected AP device.

8. The electronic device of claim 6, wherein the processor is configured to update the network identifier data based on at least one of information obtained through channel scanning and a beacon frame received from the currently connected network.

9. The electronic device of claim 1, wherein a case in which the access to another network from the currently connected network is necessary comprises at least one of a case in which a communication quality of the currently connected network does not meet a set condition and a case in which the Internet of the currently connected network is not connected.

10. A wireless communication method comprising:
    performing channel scanning;
    receiving a beacon frame and/or a probe response frame from a peripheral access point (AP) device through a wireless communication;
    identifying one or more network identifiers of a co-located AP device based on the beacon frame and/or the probe response frame;
    determining one or more candidate networks by excluding one or more networks identified based on the one or more network identifiers of the co-located AP device from one or more candidate networks determined by the channel scanning, in response to determining an access to another network from a network of a currently connected AP device is necessary;
    determining a target network for an access attempt among the one or more candidate networks; and
    attempting a connection to the determined target network.

11. The electronic device of claim 10, wherein
    at least one of the beacon frames and the probe response frames comprises a reduced neighbor report (RNR) element field,
    the RNR element field comprises a subfield which indicates whether a basic service set ID corresponding to the beacon frame or the probe response frame and a basic service set ID corresponding to a neighbor report belong to the co-located AP device, and the identifying of the one or more network identifiers of the co-located AP device comprises identifying the network identifiers of the co-located AP device based on a value of the subfield.

\*    \*    \*    \*    \*